United States Patent [19]

Luthardt et al.

[11] Patent Number: 5,644,905
[45] Date of Patent: Jul. 8, 1997

[54] STRANDING DEVICE WITH AN EXCHANGEABLE SUPPLY MEMBER AND AN ASSOCIATED METHOD

[75] Inventors: Reiner Luthardt; Günter Wünsch, both of Bundesrepublik, Germany

[73] Assignee: Siemens Aktiengesellschaft, Munich, Germany

[21] Appl. No.: 454,224

[22] PCT Filed: Oct. 11, 1992

[86] PCT No.: PCT/DE94/01192

§ 371 Date: Jun. 12, 1995

§ 102(e) Date: Jun. 12, 1995

[87] PCT Pub. No.: WO95/10843

PCT Pub. Date: Apr. 20, 1995

[30] Foreign Application Priority Data

Oct. 14, 1993 [DE] Germany .................. 43 35 090.9
Jul. 8, 1994 [DE] Germany .................. 44 24 174.7

[51] Int. Cl.⁶ .................. D02G 3/36; D01H 13/26
[52] U.S. Cl. .................. 57/17; 57/10; 57/11; 57/18; 57/293; 57/294; 57/314
[58] Field of Search .................. 57/3, 10, 11, 12, 57/13, 17, 18, 314, 293, 294

[56] References Cited

U.S. PATENT DOCUMENTS

| | | | |
|---|---|---|---|
| 2,416,076 | 2/1947 | Uhler | 57/17 |
| 3,293,837 | 12/1966 | Vennett | 57/13 |
| 3,604,192 | 9/1971 | Garner | 57/13 |
| 4,359,857 | 11/1982 | Oestreich | 57/294 |
| 4,411,130 | 10/1983 | Dubois et al. | 57/13 |
| 4,426,838 | 1/1984 | Garner et al. | 57/13 |
| 4,483,134 | 11/1984 | McKay et al. | 57/18 |
| 4,635,430 | 1/1987 | Missout et al. | 57/13 |
| 4,706,449 | 11/1987 | Akre | 57/13 |
| 4,813,223 | 3/1989 | Nipper et al. | 57/294 |
| 4,939,896 | 7/1990 | Blew | 57/293 |
| 4,974,408 | 12/1990 | Karhu | 57/293 |
| 5,237,809 | 8/1993 | Oestreich et al. | 57/293 |

FOREIGN PATENT DOCUMENTS

0 034 352  8/1981  European Pat. Off. .
0 519 284  12/1992  European Pat. Off. .

*Primary Examiner*—William Stryjewski
*Attorney, Agent, or Firm*—Hill, Steadman & Simpson

[57] ABSTRACT

A device for stranding elongated stranding elements, in which an axially extending supply member has a surface on which stranding elements are fed to a stranding disk. A first suspension device has a first receiving device for holding a first end of the supply member on an input side. A second suspension device has a second receiving device for holding a second end of the supply member on an output side. First and second locking devices respectively mount the first and second receiving devices in the first and second suspension devices, respectively, such that in a release position of a respective locking device, a respective receiving device is completely displaceable in an axial direction for installing or removing the supply member, and such that in a lock position of the respective locking device, the respective receiving device is secured against detachment during operation of the supply member.

27 Claims, 4 Drawing Sheets

STRANDING DEVICE WITH AN EXCHANGEABLE SUPPLY MEMBER AND AN ASSOCIATED METHOD

BACKGROUND OF THE INVENTION

The invention relates to a device for stranding elongated stranding elements by using an axially extending supply wire via which the stranding elements are fed to a stranding disk.

European Reference EP 0 034 352 B1 discloses a stranding device in which a stranding disk is seated in a separately withdrawable fashion on the end of a permanently attached tube accumulator via a thread there having an associated retaining nut.

By contrast, in the case of so-called supply-wire stranding machines what is important is practical accommodation of the supply wire, the stranding disk and/or further stranding components, in particular, for example, owing to the relatively small cross-sectional dimensions of the supply wire or natural stiffness of the latter.

SUMMARY OF THE INVENTION

It is the object of the invention to specify a way in which in the case of a supply-wire stranding device its supply wire, stranding disk and/or further stranding components for practical operation can be accommodated in a simple way. In accordance with the invention, this object is achieved in the case of a device of the type mentioned at the beginning by providing on the input and/or output sides suspension devices for the joint interchange of the supply wire, the stranding disk and/or further stranding components.

Owing to the suspension devices on the input and/or output sides for the joint interchange of the supply wire, the stranding disk and/or the further stranding components, these can be accommodated in an easily surveyed way in the stranding device and can be exchanged in a simple way. As a result, a quick-change system is also formed which permits short assembly times.

The invention also relates to a method for stranding elongated stranding elements by using an axially extending supply wire via which the stranding elements are fed to a stranding disk, which method is characterized in that the supply wire, the stranding disk and/or the further stranding components are jointly interchanged.

Other developments of the invention are as follows.

The suspension devices on the input and/or output sides respectively have means for axial prestressing of the supply wire.

The suspension devices on the input and/or output sides respectively have a receiving device in which the supply wire, the stranding disk and/or further stranding components are jointly accommodated. The respective receiving device is secured in position by locking means in the respective suspension device. The respective suspension device has as locking means for axially securing its receiving device latching balls which can latch tight in a transverse axial fashion into an associated latching groove of the receiving device. Alternatively, the respective suspension device has self-closed connections as locking means for securing its receiving device in the circumferential direction. The self-closed connection is effected by polygonal gearing between the receiving device and the respective suspension device. The self-closed connection is effected by a conical seat between the receiving device and the respective suspension device.

The respective receiving device is constructed in a separable fashion.

The stranding disk and/or the further stranding components are secured in position in the circumferential direction by self-closed connections in the respective receiving device.

The supply wire is permanently connected at one of its ends to the stranding disk.

The supply wire, the stranding disk and/or the further stranding components are suspended in a jointly rotatable fashion in their suspension devices on the input and/or output sides.

The supply wire, the stranding disk and/or the further stranding components are assigned a joint driving device or separate driving devices. The driving device is formed by a motor bored through at the center and through whose passage opening the supply wire is guided together with the stranding elements.

The supply wire is essentially freely accessible between the suspension devices on the input and output sides.

Adapter disks, stranding nipples or the like are provided as further stranding components.

The suspension device on the output side is assigned a winding device.

Electric and/or optical transmission elements are selected as stranding elements.

The direction of passage at least one depositing device for receiving the supply wire is additionally provided upstream of the suspension device on the input side and/or downstream of the suspension device on the output side. A take-up drum is provided as depositing device. The depositing device has a standing level which corresponds approximately to the horizontal level of the supply wire in the respective suspension device.

An input device for the stranding elements is provided at the end of the supply wire on the input side.

For assembly or disassembly the supply wire is mounted displaceably in the axial direction in the respective suspension device.

At least one covering means is provided in the course of the supply wire.

The present invention is also a method for stranding elongated stranding elements by using an axially extending supply wire via which the stranding elements are fed to a stranding disk, in particular in accordance with the above description. The supply wire, the stranding disk and/or the further stranding components are jointly interchanged. The supply wire is run with an alternating direction of rotation. In the direction of passage, the supply wire is additionally deposited in at least one depositing device upstream of the suspension device on the input side and/or downstream of the suspension device on the output side.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
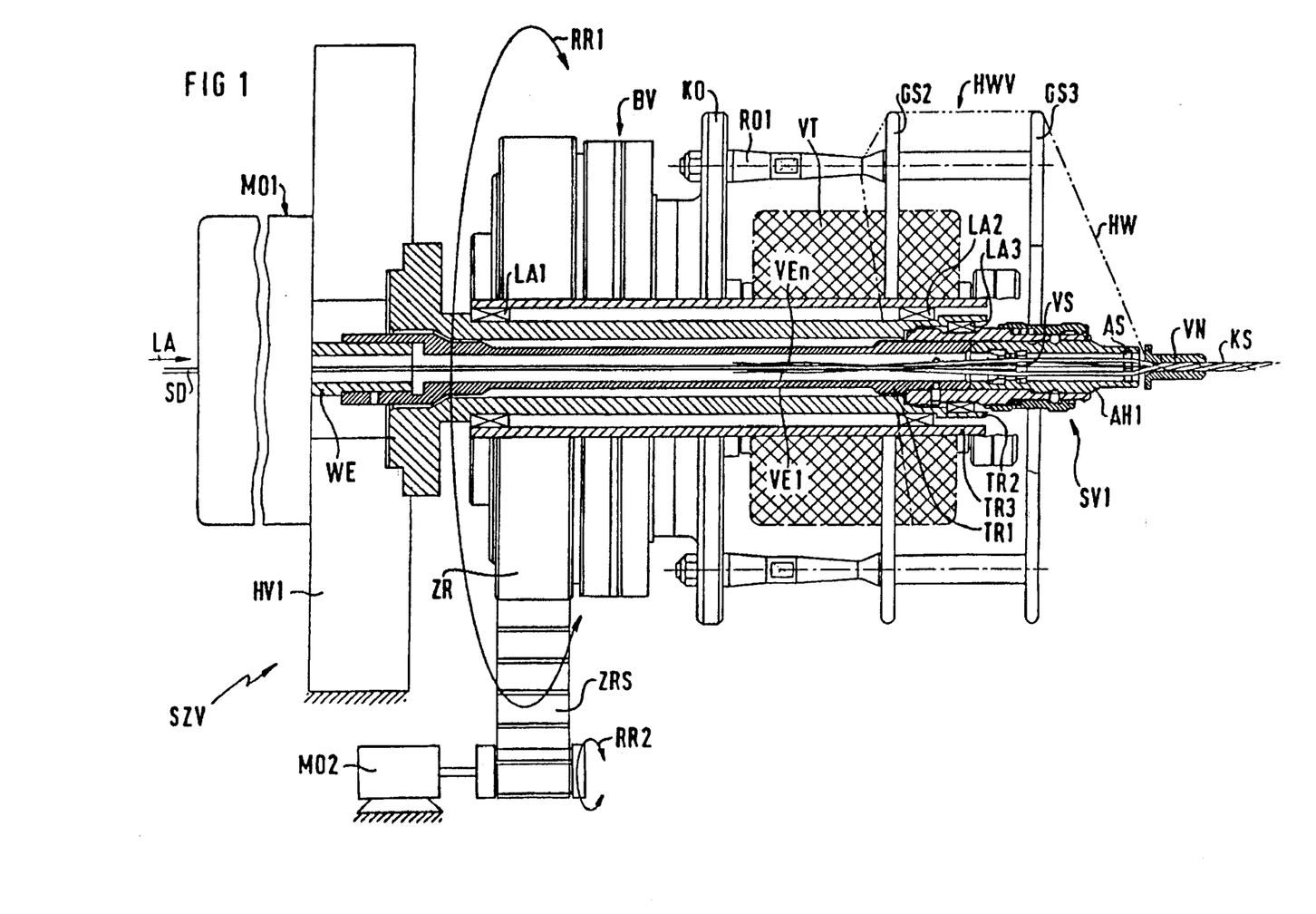
FIG. 1 shows a diagrammatic cross-sectional representation of the suspension device, on the output side, of a device according to the invention for stranding elongated stranding elements.

FIG. 1 shows a suspension device SZV on the output side as part of a stranding device according to the invention having an axially stressed, rectilinearly extending supply wire SD for SZ stranding of elongated stranding elements VE1 to VEn. For the sake of clarity, in the cross-sectional picture of FIG. 1 only the two stranding elements VE1 and VEn are illustrated along a segment on the output side, that is to say partially, while the remaining stranding elements have been omitted. Consideration as stranding elements is preferably given to electric and/or optical transmission elements, such as electric conductors (wires), optical fibers, etc. They are prestranded on the surface of the elongated supply wire SD with an alternating direction of lay (SZ stranding) in such a way that the prestressed supply wire SD is moved about its stranding axis LA in an alternating fashion in the one direction of rotation and then in the other. This alternation in the direction of rotation is indicated by a double arrow RR1.

Within the scope of the invention, the term "supply wire" is preferably understood as an elongated, flexible, stressable body. This can be, for example, a solid strand such as, for example, a steel wire, a cable made from a plurality of individual fibers such as, for example, aramid fibers, a filament or the like. The supply wire is preferably provided with as circular a cross-sectional shape as possible. The supply wire SD preferably has a low-friction sliding surface. For this purpose, the supply wire SD is preferably produced from a low-friction material or at least coated with a low-friction material. Particularly suitable for this purpose is a composite material such as, for example, $PTFE/Al_2O_3$. This material is distinguished by a high wear resistance and very low friction values. The supply wire SD preferably has a longitudinal extent of between 1 and 20 m, in particular between 5 and 10 m, preferably at approximately 10 m. Its outside diameter is expediently determined by the diameter of the stranding elements VE1 to VEn as well as by their number. In this case, the diameter of the supply wire SD is preferably selected in such a way that when the stranded product is finished there is respectively—seen around the circumference—a gap between two neighboring stranding elements VE1 to VEn which is approximately of the same size as that of the stranding elements. The outside diameter of the supply wire SD is preferably selected to be between 1 and 4 mm, in particular between 1 and 2 mm, and in the case of the use of stranding elements having an outside diameter of between 0.4 and 2 mm, between 0.5 and 1.4 mm, in particular.

In order to drive the supply wire SD, the latter is preferably permanently connected at its end on the output side to a rotating stranding disk VS and suspended rotatably there.

Figure 2:
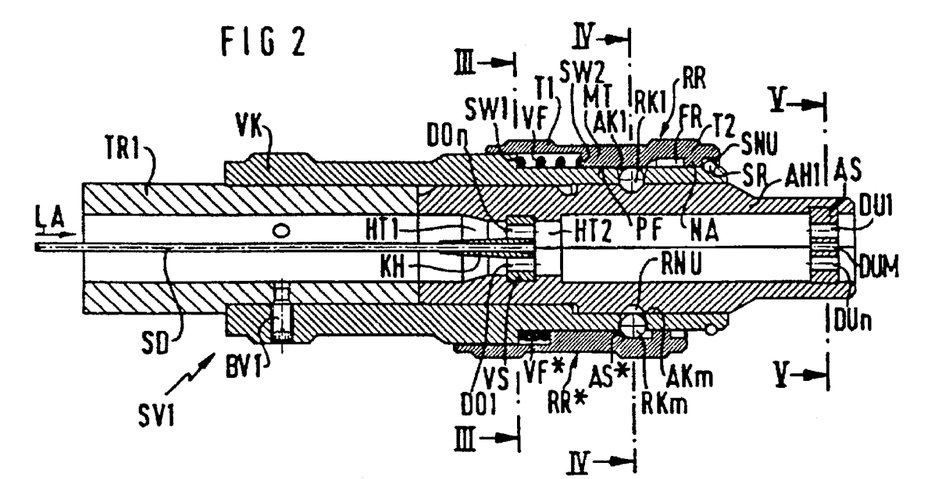
FIG. 2 shows a detail of the suspension device on the output side according to FIG. 1, FIGS. 3 to 5 show various sectional views of the suspension device, on the output side, according to FIG. 2 in a plane of the drawing which is perpendicular to FIG. 2 and folded out by 90°.

More precise data are given in this regard in the part of the description relating to FIG. 2. At its end on the input side, the supply wire SD is rotatably held in a suspension device on the input side, in particular a wire abutment, which is represented in detail in FIG. 6 and denoted by DGL. As indicated diagrammatically in FIG. 7, the supply wire SD extends in an essentially freely accessible fashion with its actual supply length between the suspension devices DGL, SZV on the input and output sides.

In the suspension device SZV, on the output side, of FIG. 1 the stranding disk VS is seated securely together with a guide or adapter disk AS which is downstream in the direction of passage in a receiving device SV1, in particular a receiving sleeve or a receiving tube having an internal passage which is essentially in the shape of a circular cylinder. This receiving device SV1 is constructed as an independent component for jointly accommodating or receiving the supply wire SD, the stranding disk VS and further, differing stranding components such as, for example, the adapter disk AS, the stranding elements VE1 to VEn of stranding nipples or the like. With the aid of locking means (compare, for example, RK1 to RK2m in FIG. 2) it is attached to the end, on the output side, of an elongated, rotatable, in particular rotatably driven support tube TR1 in such a way that it is secured against undesired detachment during operation and can be withdrawn as a whole, that is to say with the stranding components accommodated in it, in the axial direction for the purpose of assembly or disassembly.

The support tube TR1 in FIG. 1 surrounds the supply wire SD in a rotationally symmetrical fashion with reference to its stranding axis LA, preferably along the end section of said wire on the output side. The support tube TR1 is assigned at its end averted from the stranding disk VS a driving device MO1 which drives the support tube with an alternating direction of rotation (in an oscillating fashion). In the exemplary embodiment of FIG. 1, the driving device MO1 is preferably formed by a motor bored through at the center and through whose passage opening the supply wire SD is guided together with the stranding elements VE1 to VEn guided via it. In this case, the support tube TR1 is expediently permanently connected at its end on the input side to the through-bored drive shaft WE of the driving device MO1, with the result that the support tube TR1 forms a type of extended hollow shaft. In particular, for this purpose the support tube TR1 has an internal passage which is essentially in the shape of a circular cylinder in the withdrawal direction LA. The driving device MO1 is permanently attached to a fixed, flange-type holding device HV1 of which the drive shaft WE is plugged through the central passage bore of the holding device HV1.

The receiving device SV1 is supported via a preferably approximately annular bearing LA3 with respect to an external, fixed support tube TR2 which surrounds the support tube TR1 as concentrically or coaxially as possible. The support tube TR2 is permanently mounted in this case on a fixed, flange-type holding device HV1 from which the driving device MO1 is also suspended in a fixed fashion. Finally, provided coaxially or concentrically with this fixed support tube TR2 is a further, outer support tube TR3 which is held rotatably on the fixed support tube TR2 via preferably approximately annular bearings LA1, LA2 on the input and output sides. A winding or spinning device HWV is preferably seated on the support tube TR3. With the aid of a driving device MO2, in particular a motor, for example, it is possible via a toothed belt pulley ZRS to drive a toothed wheel ZR at the end of the support tube TR3 on the input side, and thus also the winding device HMV in a rotating fashion in accordance with the arrow RR2 independently of the stranding disk VS. With the aid of a braking device BV, in particular a hysteresis brake, which is arranged between the toothed wheel ZR and its basket KO, the rotatable winding device HWV can at the same time be braked in a controlled fashion. The winding device HWV has a dispenser reel VT with a strand-shaped winding material, in particular a binder HW. Via a transverse rod RO1 and radially extending longitudinal rods, for example GS2 and GS3 (of the frame of the basket KO), for example, the binder HW is fed to a stranding nipple VN, located downstream of the adapter disk AS on the output side, in an oblique fashion, that is to say in the direction of the imaginary stranding point of said nipple. Wound in a defined way with the aid of the binder HW, that is to say under a defined winding tensile stress, the elongated stranding elements VE1 to VEn can in this way be fixed in the stranding nipple VN directly downstream of their SZ stranding as a stranded assembly, with the result that a wrapped cable core KS is formed.

FIG. 2 shows in detail the receiving device SV1 of the suspension device SZV, on the output side, of FIG. 1 on the end of the support tube TR1. In this case, elements taken over unchanged from FIG. 1 are provided with the same reference symbols. The receiving device SV1 has preferably at the end of the support tube TR1 an approximately tubular connecting part VK into which an expediently tubular, in particular sleeve-like, receiving part AH1 can be inserted or plugged. The connecting part VK is seated securely in this case with the aid of fastening means BV1, in particular screws or connecting pins, on the end, on the output side, of the support tube TR1 as an extension. The connecting part VK thus serves to couple the receiving part AH1 to the support tube TR1. The connecting part VK preferably has an inside diameter which corresponds approximately to the outside diameter of the receiving part AH1 and/or of the support tube TR1. For operation, the receiving part AH1 is secured in position in the passage opening of the connecting piece VK with the aid of locking means in the axial, radial and circumferential directions in such a way that as rigid as possible a connection with the support tube TR1 as drive shaft is achieved. At the same time, in an advantageous way these locking means also permit as far as possible a quick change of the complete receiving part AH1 with the stranding components situated therein, preferably without a tool. For the purpose of better illustration of the mode of operation of this quick closure, the receiving device SV1 is drawn in its locking position in the upper half of the picture in FIG. 2 as well as simultaneously, in the lower half of the picture, in its release position for inserting or withdrawing the receiving part AH1.

For the purpose of axially securing the receiving part AH1 during operation, latching balls RK1 to RKm are provided in the outer lateral surface of the connecting part VK as locking means which are seated in an annular fashion distributed around the circumference in individual passage openings AK1 to AKm which are continuous in a transverse axial fashion relative to the receiving part AH1.

For the sake of simplicity, the cross-sectional picture of FIG. 2 shows only the latching balls RK1 in the upper half of the picture as well as the latching balls RKm in the lower half of the picture. The functioning and mode of operation of these two latching balls apply analogously for the remaining latching balls RK2 to RKm–1.

In its locking position, the latching ball RK1 is seated securely in the passage opening AK1, which tapers radially inwards and preferably comes to a conical point, and partly projects into a preferably approximately annular latching groove RNU on the outer circumference of the receiving part AH1, with the result that a transverse axial block or lock is formed for the receiving part AH1 against axial displacement in the interior of the tubular connecting piece VK. The passage opening AK1 coming to a conical point radially inwards is expediently dimensioned in this case in such a way that the latching ball RK1 cannot fall through completely radially inwards, and this is particularly important when removing the receiving part AH1. It is likewise expedient for the latching groove RNU to taper radially inwards. It has an approximately sector-shaped or trapezoidal cross section, so that the section of the latching ball RK1 projecting inwards from the contour of the connecting part VK, in particular the lower half of the ball, can be received by it in a self-closed fashion substantially without lateral or axial play.

The latching ball RK1 is held latched tight in this locking position in the latching groove RNU by a cylindrically constructed latching ring RR, which is seated outside at the end on the connecting piece VK. For this purpose, the latching ring RR has as middle part MT an approximately rectangular offset which projects radially inwards and whose underside PF covers the passage opening AK1 in a planar fashion from outside. In this arrangement, the latching ring RR bears with its middle part MT directly against the latching ball RK1, with the result that the latter is pressed into its locking position without radial play and fixed there permanently in operation. During the rotary movement of the receiving device SV1, it cannot move outwards radially there. An undesired axial detachment of the receiving part AH1 is reliably avoided in this way.

In the locking position, the latching ring RR is under the spring tension of a closure spring VF which surrounds the connecting part VK in an annular fashion. In this arrangement, the closure spring VF is supported between a side wall SW1 of an approximately step-shaped offset, which drops vertically, of the connecting piece VK and the vertical side wall SW2, averted from the output, of the middle part MT of the latching ring RR. The closure spring VF is held or clamped axially in a type of receiving groove between the edge of discontinuity, dropping approximately vertically, of the connecting piece VK and the middle part MT, projecting in an approximately rectangular fashion, of the latching ring RR. The latching ring RR in this case covers this receiving groove towards the outside with its left-hand segment T1, which is averted from the output, with the result that a type of receiving chamber is formed for the closure spring VF.

At its end on the output side, the latching ring RR is locked with the aid of a snap ring SR which is partially let into a groove in the outer lateral surface of the end, on the output side, of the connecting piece VK, and is seated there securely projecting radially outwards. In this locking position of the latching ring RR, the snap ring SR is latched tight into an approximately groove-shaped cutout SNU of the segment T2, on the output side, of the latching ring RR, with the result that the latching ring RR is retained in this locking position under spring tension and blocked or locked in the direction of passage LA. In this case, together with the snap ring SR a nose NA on the latching ring RR limits the clamping distance and prevents the latching ring RR from falling down in the axial direction (direction of passage) LA. In this way, the latching ring RR is seated securely on the end, on the output side, of the connecting piece VK without being able to be automatically displaced axially. In this locking position of the latching ring RR, the latching ball RK1 then effects locking or blocking transverse to the direction of passage LA (in a transverse axial fashion) for the receiving part AH1 in the tubular connecting piece VK.

In order to release or cancel this transverse axial blocking lock so as to insert and/or remove the receiving sleeve AH1, the latching ring RR is pressed back into a release position against the direction of passage LA and thus against the spring force of the closure spring VF. This release position of the latching ring is represented in the lower half of the picture, the latching ring RR now additionally being marked there, in common with the closure spring VF thereof, by an *. If the latching ring is pressed out of its locking position into its release position (RR*), the latching ball RKm can, for example, move backwards radially outwards into a cutout or retaining chamber FR (compare the top half of the picture) of the latching ring RR*, which cutout runs in an annular fashion in the outer lateral surface of the receiving part AH1 and is approximately rectangular in the cross-sectional picture of FIG. 2, as soon as the receiving sleeve AH1 is withdrawn in the axial direction LA or inserted in the opposite direction. Specifically, the latching ball RKm is then raised out of the receiving part AH1 by one of the two passing, bevelled side walls of the latching groove RNU in the receiving part AH1 and pressed outwards, with the result that the passage opening of the connecting piece VK is released as completely as possible inside. In this way, the transverse axial lock is cancelled for the receiving part AH1, that is to say the latching ball RKm then no longer projects into the passage opening of the connecting piece VK. In this case, the latching balls are respectively held in their passage opening in a freely displaceable fashion between the latching ring RR* and the connecting piece VK. The closure spring VF* compressed in the release position preferably limits the length of the axial displacement for the latching ring RR in the opposite direction to the withdrawal direction LA.

Starting from the release position of the latching ring RR* in the lower half of the picture, after the insertion of a receiving part AH1 newly fitted with stranding components, for example, said ring is released, with the result that it is automatically pressed back again into its locking or latching position (compare the upper half of the picture) by the closure spring VF*. In this case, for example, the latching ball RKm is then pressed radially inwards onto the latching groove RNU, and latched tight there, by the passing, slightly bevelled edge AS* of the cutout or the retaining chamber FR of the latching ring RR.

In this way, a quick closure is formed for the receiving part AH1 and advantageously permits the latter to be installed and/or dismounted (changed) in a simple way without a tool. Operating the closure device SV1 by hand is thus rendered possible, that is to say, for example, the latching ring RR is brought into its release position by hand (preferably in the manner of a "single-handed coupling"), while the receiving part AH1 can be withdrawn from or pushed into the connecting piece VK1 with the other hand.

Securing the receiving part AH1 in the circumferential direction (=securing with respect to rotation) in the connecting piece VK is ensured, in particular, by means of a self-closed connection, in particular a polygonal gearing, as locking means between the outer lateral surface of the receiving part AH1 and the inner lateral surface of the connecting piece VK. It is possible in this way for torques to be transmitted between these two components reliably in the circumferential direction, in particular largely with little slip, that is to say a drive which is largely secured with respect to rotation or is rigid is ensured. At the same time, easy, axial displaceability, and thus mountability and/or dismountability of the receiving part AH1 on the support tube TR1 are rendered possible. The same type of locking means can preferably also be used to secure the radial position of the receiving part AH1. Further details on the functioning and mode of operation of the self-closed connection between the receiving part AH1 and the connecting piece VK are given in relation to FIGS. 3 to 5.

In this way, together with the stranding components such as, for example, the stranding disk VS, the adapter disk AS, the supply wire SD, etc. which are accommodated in and/or mounted on it, the receiving part AH1 can be removed as an independent unit, that is to say as a whole, from the suspension device SZV on the output side and, as the case may be, exchanged for others. It is expedient in this case for it to be possible to separate the receiving part AH1 into two halves. Its interior is then freely accessible, with the result that the stranding components can be removed from its interior preferably by hand, that is to say without a tool, and can, for example, be replaced by new ones. This free accessibility of the receiving part AH1, which can be detached from the support tube TR1, renders it possible, in particular, for the stranding elements VE1 to VEn to be threaded simply and quickly through the passage openings DO1 to DOn of the stranding disk VS and/or through the passage openings DU1 to DUn of the adapter disk AS downstream of the stranding disk VS. Exchanging the supply wire SD in the case of wear is also advantageously rendered possible, for example. The supply wire SD is advantageously permanently connected, in particular via a glued connection, at its end on the output side to the stranding disk VS. This connection can be, for example, a rotationally symmetrical sleeve or nose KH widening conically in the axial direction LA. As a result, the supply wire SD can advantageously be interchanged or exchanged jointly with the stranding disk VS, and because of the particularly small dimensions of the stranding disk VS and of the small cross-sectional dimensions of the supply wire SD this facilitates their manipulation. In this case, the stranding disk VS is connected to the supply wire SD via the nose KH, preferably by soldering or welding. In particular, a glued connection between the stranding disk VS and the supply wire SD is particularly insensitive with respect to possible connection breakages, that is to say particularly durable. The sleeve KH is advantageously mounted at the center of the stranding disk VS. Owing to its conically increasing widening in the direction of passage, it supports the feeding of the stranding elements VE1 to VEn to the passage openings DO1 to DOn, which are arranged concentrically with respect to the stranding axis in the manner of a hole circle. It advantageously avoids an excessively abrupt, sharp raising of the stranding elements VE1 to VEn from the supply wire SD owing to its slightly rising (conical) course in the axial direction toward the passage openings DO1 to DOn.

The axial position or the position of the stranding disk VS for operation is prescribed in this case by the remaining opening between two holding parts HT1 and HT2 which are mounted, in particular glued, in a transverse axial fashion in the receiving part AH1, with the result that the position of the stranding disk VS is unmistakable to the operator. The stranding disk VS can be inserted in a fashion which is self-closed or accurate to fit between these two transverse axial holding parts HT1, HT2, and can thus be secured in position in the axial direction. They therefore advantageously form simultaneously means for axial prestressing of the supply wire SD in the suspension device SZV on the output side, since they represent an axial block for the stranding disk VS with the supply wire SD mounted on it at the end. It is also possible corresponding to this for the adapter disk AS to be fitted in a transverse axial fashion in the receiving part AH1 or to be plugged into an annular groove on the inner circumference of the receiving part AH1.

The passage bores DO1 to DOn of the stranding disk VS are provided on a circular arc concentric with the supply wire SD. They are preferably arranged mutually offset by respectively approximately the same circumferential angle, and are respectively essentially at the same radial distance from the outer surface of the supply wire. The passage bores DO1 to DOn are preferably arranged with the smallest possible radial distance from the stranding axis, in order largely to prevent the stranding elements VE1 to VEn lifting from the supply wire SD and thus largely to prevent malfunctions during the stranding process. The stranding disk VS thus forms a type of rotationally symmetrical hole circle. The passage bores DO1 to DOn are preferably adapted, seen in cross section, to the cross-sectional shape of the stranding elements VE1 to VEn, in particular constructed in an approximately circular fashion. Their inside diameter is selected to be preferably at least equal to, in particular greater than the outside diameter of approximately circular stranding elements, with the result that the latter are guided through as free from stress as possible.

If the stranding elements VE1 to VEn are, for example, not stranded onto a central core element, each stranding element VE1 to VEn is expediently respectively assigned to one of the passage openings for the adapter disk or distributor disk AS. For the rest, its passage openings DU1 to DUn are constructed and arranged in a fashion analogous to those of the stranding disk. Preferably, the assignment between the passage openings DO1 to DOn of the stranding disk VS and the passage openings DU1 to DUn of the adapter disk AS is performed in such a way that after emerging from its passage opening, assigned to it, of the stranding disk VS, the respective stranding element approaches the downstream passage opening, specifically assigned to it, of the adapter disk AS as far as possible parallel to the stranding axis and as far as possible in a straight line. That means, in other words, that in the inserted state the passage openings DO1 to DOn of the stranding disk VS are expediently arranged to be as far as possible aligned and thus congruent with the passage openings DU1 to DUn of the adapter disk, in order to be able to draw the stranding elements into the stranding device in a defined way.

It can also be expedient, as the case may be, for one of the stranding elements VE1 to VEn to be guided through an additional passage bore DUm at the center of the adapter disk AS. The other stranding elements can then preferably be stranded onto this centrally guided stranding element. Such a core element can preferably be of the same type as the remaining stranding elements which are to be applied. It can also be expedient in precisely this way under certain circumstances for a core element differing from the remaining stranding elements also to be guided on the supply wire during prestranding. Thus, for example, a particularly tension-proof, elongated central element, for example, can be provided as the core element.

The adapter disk AS thus advantageously ensures, as the case may be, for such a subsequent splitting up of the stranding elements that a prescribable stranding element from the group of the prestranded, elongated, in particular strand-shaped stranding elements VE1 to VEn is guided as the central element through its central passage opening DUM, and finally it is rendered possible thereby for the remaining stranding elements to be stranded onto this central element in the subsequent stranding nipple VN (compare FIG. 1).

Figure 3:
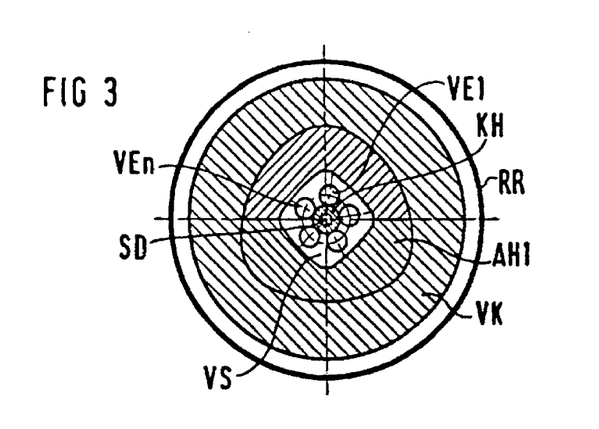
Figure 4:
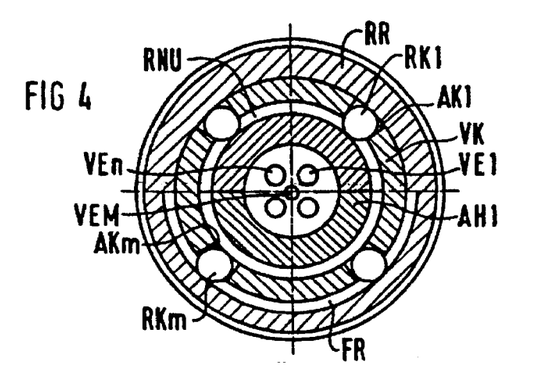
Figure 5:
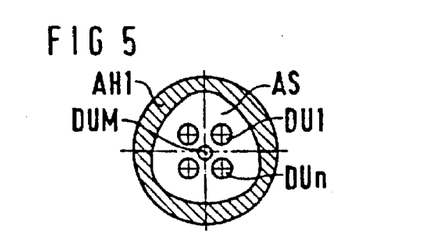

In order to illustrate better how the receiving part AH1 is suspended in the receiving device SV1 of FIG. 2 and how the stranding components are accommodated in the receiving part AH1, FIGS. 3 to 5 show sectional pictures of three different points of section of FIG. 2 in a plane of the drawing which is folded out by 90° at right angles to FIG. 2. Elements taken over unchanged from FIGS. 1 and 2 are provided in this case in FIGS. 3 to 5 with the same reference symbols in each case.

A section along the line III—III in FIG. 2 in the region of the stranding disk VS, provides the cross-sectional picture of FIG. 3, which gives an enlarged reproduction of the components of the receiving device SV1 which are shown there. The receiving part AH1 has an approximately triangular outer contour ("triangular polygon"), and is seated securely in a self-closed fashion (snug fit) in the inner contour, formed in the "shape of a triangular polygon" fitting said outer contour, of the passage opening of the connecting piece VK. This snug fit guarantees reliable transmission of torque in the circumferential direction between the connecting piece VK and the receiving part AH1. In this arrangement, the oblique faces of the polygonal outer border of the receiving part AH1 and its polygonal "fitting" into the connecting piece VK reliably prevent the receiving part AH1 from "slipping through" (as, for example, in the case of a circular "fit"). The receiving part AH1 is thereby driven by the connecting piece in the respective direction of rotation largely free from slip, that is to say secured with respect to rotation.

The receiving part AH1 is also secured in position in the radial direction owing to the self-closed fit. Unbalances, that is to say breaking away of the receiving part AH1, and thus any impermissible push forces on the receiving part AH1 are thus largely avoided even in the case of alternating speeds (for example, from ±5000 revolutions/min in the case of SZ stranding), that is to say stabilization of the running smoothness of the receiving part AH1, the connecting piece VK, the support tube TR1 and thus the complete drive train is rendered possible. A type of rigid connection is thus produced between the receiving part AH1 and the connecting piece VK, both in the circumferential direction and in the radial direction. At the same time, simple axial mountability or demountability is nevertheless maintained in an advantageous way for the receiving part AH1, since the receiving part AH1 can be displaced axially into its release position immediately by actuating the latching ring RR (compare FIGS. 1, 2).

The stranding disk VS likewise has a polygonal outer contour, in particular an approximately rectangular or diamond-shaped outer border ("quadrilateral polygon") and is seated securely in a self-closed fashion, that is to say without play in the radial direction, during the rotary movement of the support tube TR1 or of the receiving device SV1 in the receiving part AH1, which is securely driven in the direction of rotation. For this purpose, the receiving part AH1 has an inner contour which is constructed "in the shape of a quadrilateral polygon" in accordance with the outer shape of the stranding disk VS. Owing to this self-closed, secure seat (snug fit) in the radial and in the circumferential directions, said disk is reliably driven in the receiving part AH1 in the direction of rotation in simultaneous conjunction with stable running, that is to say in the radial direction it is secured in position against displacement out of its rotationally symmetrical arrangement, and is secured with respect to rotation in the circumferential direction by the non-round outer contour "fit". The functioning and mode of operation of accommodating the stranding disk VS in the receiving part AH1 thus correspond to that of the receiving part AH1 itself in the connecting piece VK, considered in the circumferential direction and in the radial direction. It is expedient to select for the adapter disk AS the same type of position of security as for the stranding disk VS.

For the purpose of securely driving the stranding disk and/or the further stranding components in the circumferential direction in simultaneous conjunction with stable running during the rotary movement of the receiving part AH1, the former are secured in position in each case in the interior of the latter (passage opening) by means of self-closed connections. Polygonal gearings are particularly suitable for this purpose. Reliable transmission of torque is thereby guaranteed. In a fashion analogous thereto in terms of functioning and mode of operation, the receiving part AH1 itself is also secured in position in the radial and in the circumferential directions in the receiving device SV1 via self-closed connections. In particular, for the purpose of secure driving, polygonal gearing with the connecting piece VK ensures for the receiving part AH1 an essentially rigid connection even in the direction of rotation.

FIG. 4 shows the receiving device SV1 in cross section for a section along the line IV—IV in FIG. 2 in the region of the latching balls RK1 and RKm. The latching ball RK1 in the upper half of the picture of FIG. 4 is located in its locking position. The transverse axial lock by the latching ball RK1 is effected owing to the fact that the latching ring RR bears securely outside against the latching ball RK1, and the latching ball RK1 is seated securely radially inwards in the latching groove RNU of the receiving sleeve AH1 in a fashion largely free from play. The movement of the latching ball RK1 in the radial direction is thereby impossible. It is equally as little able to move in the axial direction LA (compare FIG. 2), since it is held in the passage opening AK1 without lateral play in the axial direction LA (compare FIG. 2). The latching ball RK1 is thus latched tight securely in the latching groove RNU and represents a transverse axial block, in particular one which is perpendicular with respect to the stranding axis, for the receiving part AH1 in the passage opening of the elongated connecting piece VK.

By contrast therewith, the lower half of the picture in FIG. 4 shows the latching ball RKm in its release position. The latching ball RKm now no longer projects into the latching groove RNU, and thus also no longer acts as a transverse axial block. Rather, upon insertion or withdrawal of the receiving part AH1 it is pressed radially outwards into the approximately annular receiving groove or retaining chamber FR of said part, with the result that it no longer projects into the passage opening of the connecting piece VK.

Finally, FIG. 5 shows the receiving part AH1 of FIG. 2 in cross section for a section along the line V—V in the region of the adapter disk AS. The adapter or guide disk AS is likewise secured in position in the receiving part AH1 in the circumferential and in the radial directions with the aid of "triangular polygonal gearing" (corresponding to the receiving sleeve AH1 in the connecting piece VK (compare FIG. 3)). Consequently, it can be driven by the receiving part AH1 without play, that is to say without slip, in the direction of rotation and reliable transmission of torque in the circumferential direction can be ensured in simultaneous conjunction with stable running smoothness.

In addition to the "triangular" and "quadrilateral" polygonal gearings illustrated in FIGS. 3 to 5, further self-closed connections for securing the receiving part AH1, the stranding disk VS, the adapter disk AD, etc. in the circumferential and in the radial directions are, of course, also possible. Particularly suitable are polygonal gearings having multifarious cross-sectional shapes such as, for example, a "pentagonal", "hexagonal" contour, etc., that is to say preferably polygonal borders.

Figure 6:
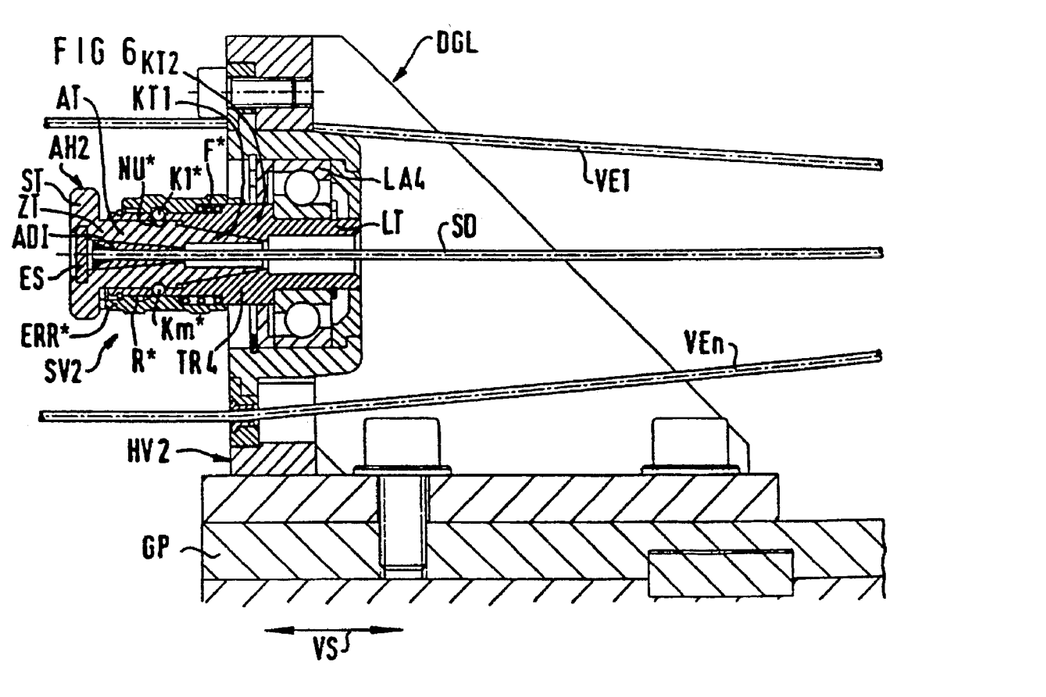
FIG. 6 shows the suspension device, on the input side, of the device according to the invention for stranding elongated stranding elements.

Finally, FIG. 6 shows the suspension, on the input side, of the supply wire SD. The reference symbols of elements taken over unchanged in function and mode of operation from FIGS. 1 to 5 are additionally marked in this case with an asterisk*. The supply wire SD is held rotatably in a wire abutment DGL as suspension device on the input side via a bearing LA4 in a holding device HV2 which is fixed in operation. For the purpose of stressing the supply wire SD, the holding device HV2 is mounted fixed on a clamping device GP which can be displaced axially, that is to say parallel to the stranding axis. The displaceability of said clamping device is indicated by a double arrow S in FIG. 6, The wire abutment DGL has a receiving device SV2 with a receiving part AH2 for the supply wire SD. Seen along the stranding axis in the direction of passage, this receiving part AH2 has a flange or web ST which is at the end face, projects in a transverse axial fashion and serves the purpose of improving handling of the receiving part AH2. Adjacent thereto as a shaft is an essentially circular cylindrical middle part ZT. On the output side, the middle part MT merges as tip into a clamping part KT1 which with respect to its outer contour tapers essentially in the shape of a cone in the direction of passage. The "stopper-like" or "arrow-like" receiving part AH2 is plugged securely in a self-closed fashion by means of its middle part MT and its clamping part KT1 in end sections, shaped to fit therewith in each case, of the passage opening of a rotatably mounted locking part TR4, in particular a support tube, with the result that a type of conical seat is effected there between the receiving part AH2 and the locking part TR4. In this arrangement, the locking part TR4 is supported by means of a bearing part LT on the output side via the bearing LA4, in particular a radial ball bearing, with respect to the preferably flange-type holding device HV2. This bearing part LT expediently has a circular cylindrical passage opening with an inside diameter sized such that together with the stranding disk VS securely suspended from it on the output side the supply wire SD can be threaded or drawn through the receiving part AH2 for the purpose of mounting or dismounting. The receiving part AH2 is thus formed by an input part AT with an approximately circular cylindrical passage, a middle part KT2, adjoining the latter in the direction of passage and having a conically tapering passage opening, as well as the bearing part LT following thereupon. The inside diameter of the passage opening in the bearing part LT corresponds approximately in this case to the inside diameter at the output of the frustoconical passage opening of the middle part KT2.

In the region of its middle part ZT, the receiving part AH2 can preferably be locked or blocked in the locking part TR4 in the axial direction with the aid of latching balls K1* to Km* in a fashion analogous to the closing mechanism of the suspension device SZV, on the output side, of FIGS. 1 to 5. In this case, the release position is shown in the upper half of the picture in FIG. 6, and the locking position in the lower half of the picture. The latching balls K1* to Km* are seated in this case in passage openings in the lateral surface of the locking part TR4. In a fashion analogous to the suspension device SZV on the output side, they are preferably partially pressed with the aid of a latching ring ERR* covering them on the outside from the retaining chamber R* into an annular latching groove NU* on the outer circumference of the receiving part AH2 under the spring tension of a closure spring F*, with the result that a transverse connection is produced between the locking part TR4 and the receiving part AH2. Since the structure and mode of operation of this axial closure device on the input side preferably correspond to the closure mechanism, on the output side, of FIGS. 1 to 5, the receiving part AH2 is detachable in the axial direction, and thus can be withdrawn from the locking part TR4 for dismounting or can be inserted into the locking part TR4 for mounting. An appropriate modification of the various closure elements of FIGS. 1 to 5 such as, for example, the latching balls with respect to their dimensioning for use on the input side may be expedient. The receiving part AH2 is thus secured in position in the locking part TR4 in the following ways:

In a fashion analogous to the receiving part AH1 on the output side, a transverse axial locking means for the receiving part AH2 is provided in the axial direction with the aid of the latching balls K1* to Km*. A rigid connection is thus effected in the axial or longitudinal direction between the locking part TR4 and the receiving part AH2.

Seen in the circumferential direction, an essentially self-closed connection, and thus a lock, is effected between the conical clamping part KT1 of the receiving part AH2 and the middle part KT2, shaped to fit therewith, of the locking part TR4. The self-closed connection thus amounts to a certain extent to a locking means in the circumferential direction. Since for operating the stranding device, that is to say for stressing the supply wire SD, the clamping device GP is preferably moved into a position which is further removed from the fixed suspension device SZV on the output side than in the mounted state, the clamping part KT1 is, to be specific, pressed or clamped into the middle part KT2, which is shaped cortically to fit therewith. It is thus seated securely in a fashion shaped to fit, that is to say by a clamping seat, in particular a conical seat, and in a self-closed fashion in the locking part TR4. The receiving part AH2 is in this way secured with respect to rotation in the locking part TR4. An essentially low-slip coupling, which is as rigid as possible, and secure drive in the circumferential direction is thus ensured largely for the receiving part AH2 during operation by means of the rotating locking part TR4.

The receiving part AH2 is locked or secured in position in the radial direction by the conical seat, that is to say its self-closed connection with the locking part TR4. The result of this is preferably that unbalances on the suspension device DGL on the input side and any impermissible vibrations of the supply wire SD resulting therefrom are largely prevented. Stable running of the stranding device which is essentially low in vibration is ensured in this way. The self-closed connection thereby amounts, in particular, to a locking means in the radial direction.

Independently of or supplementary to the latching balls K1* to Km* acting in a transverse axial fashion, the "conical seat" between the receiving part AH2 and the locking part TR4 additionally helps to secure the position of the receiving part AH2 axially, since when the supply wire SD is stressed, the receiving part AH2 is drawn further into the locking part TR4 and also locked in the longitudinal direction there by back-pressure. The clamping part KT1 of the receiving part AH2 is wedged in this case in the conically bored middle part KT2 of the locking part TR4.

As an alternative to this "clamping seat", other self-closed connections are also expedient between the receiving part AH2 and the locking part TR4, which ensure the easy detachability of the latter from one another in the axial direction for mounting or dismounting. Thus, for example, polygonal gearing such as between the receiving part AH1 on the output side and the connecting part VK associated therewith can also be expedient, as the case may be, between the receiving part AH2 and the locking part TR4.

The receiving part AH2 itself is preferably constructed in a separable fashion so that the supply wire SD can be inserted into its passage opening, which can be rendered freely accessible. The supply wire SD is preferably provided in the region of its end on the output side with a conically tapering thickened part ADI by means of which it is seated securely in a self-closed fashion, that is to say securely clamped, in the end section, fitting said thickened part, of the passage opening of the receiving part AH2, with the result that a type of conical seat is likewise effected for the supply wire SD. The thickened part ADI can, for example, be formed by plugging on and bonding on a slightly conical end piece or a sleeve (in particular, made from metal) with a passage bore for the supply wire SD. Supply wires prepared in such a way at the end on the input side are to be expediently held in store. They are to be capable of being suspended particularly quickly in the receiving part AH1 and thus in the receiving device SV2, and of being interchanged conveniently and simply. In addition to, or independently of, this, the supply wire SD can be provided, as the case may be, at its end at the end face with a transverse axial end piece or web ES which engages as a transverse axial block in an annular groove on the inner edge of the passage opening of the receiving part. A rigid coupling of the supply wire SD to the receiving part AH2, and thus a reliable transmission of torque are rendered possible by means of this transverse axial block and/or, in particular, by the "conically seated" connection between the thickened part ADI of the supply wire SD and the receiving part AH2. At the same time, the supply wire SD can be removed from the receiving device SV2, and reinserted, together, that is to say jointly, with the receiving part. A quick change of the stranding components is thus rendered possible.

It can also be expedient, as the case may be, for the supply wire SD to be securely accommodated, that is to say to be secured in position, in the receiving part AH2 by means of glued connections or other bonded connections. Such supply wires fitted at the end are preferably to be held in store, since they can be mounted particularly quickly on the suspension device on the output side. (Insertion into the receiving part is then omitted.)

Viewed overall, the axially detachable receiving part on the input side and/or output side is the first ever to provide the possibility of accessing in a largely unhindered fashion the stranding components such as, for example, the stranding disk, the adapter disk, the supply wire, etc. of the stranding device for the purpose of mounting or dismounting. Consequently, a joint interchange of the respective stranding components of the suspension devices on the input and/or output sides is rendered possible. In particular, there is formed on the input and/or output sides a quick-acting closure which in operation secures the position of the stranding components in the suspension devices on the input and/or output sides, but at the same time in the case of mounting permits quick and simple detachment and changing of the stranding components.

The suspension devices according to the invention on the input and/or output sides are also advantageously suitable for Lang-lay stranding machines which use a supply wire.

Reference is preferably made below to FIGS. 1 to 6, as well as to the statements made with respect thereto. Elements taken over unchanged are respectively provided in this case with the same reference symbols.

In stranding machines which—preferably for the SZ stranding technology-operate with an elongated, rotating supply wire, the process of fitting them with stranding components such as, for example, a stranding disk, stranding elements, adapter disks, etc. can, on occasion, become difficult.

A development of the invention is based, in particular, on the object of indicating a way in which the stranding components of a stranding device can be changed in a simple way. This is achieved in that, seen in the direction of passage, at least one depositing device for receiving the supply wire is additionally provided upstream of the suspension device on the input side and/or downstream of the suspension device on the output side.

This development is distinguished chiefly in that the process of fitting such a stranding device is advantageously facilitated by the additional provision of a depositing device for the elongated supply wire at the end of the latter's suspension devices on the input and/or output sides.

The point is that the depositing device receives the supply wire for mounting, with the result that the suspension devices on the input and/or output sides and the actual supply length between the suspension devices on the input and output sides are freely accessible. This improves the manipulability of the stranding device not insubstantially. Thus, the stranding components such as, for example, the stranding disk, adapter disk(s), guide disk(s), the supply wire, the stranding elements and other components of the stranding device can be changed without an excessively high outlay and largely without hindrance. This plays a not inconsiderable role, in particular, in the case, for example, of an end of the running lengths of the stranding elements, a change of product, machine faults, work on wear and tear or servicing of the stranding device, since the supply wire can be exchanged or interchanged in short mounting times, and the stranding elements can be drawn in again to the stranding disk in a particularly reliable fashion, that is to say without confusion. This therefore gives rise advantageously to a type of quick-change system which no longer requires each individual stranding element to be threaded individually by hand over the entire supply length such as, for example, in the case of an enclosed tube accumulator.

Figure 7:
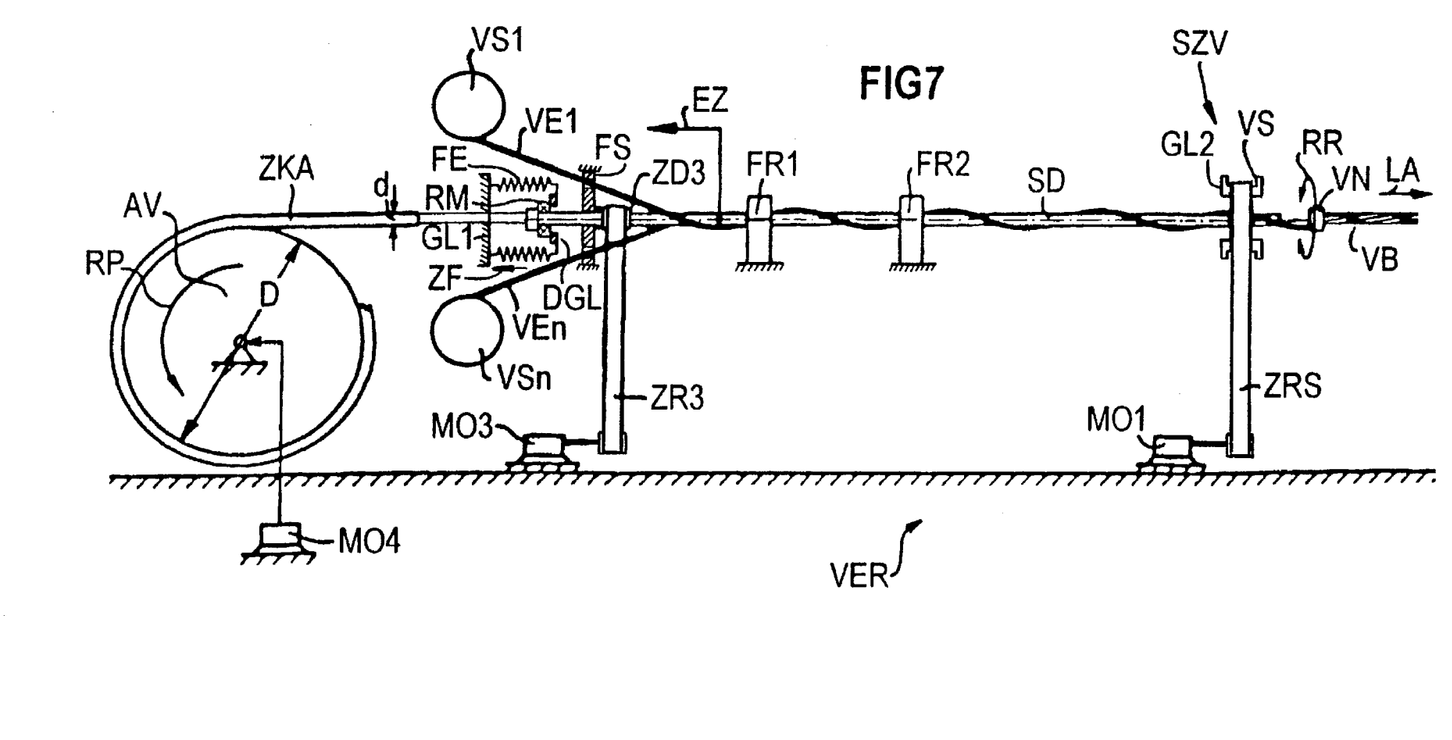
FIG. 7 shows the diagrammatic overall design of a stranding device according to the invention having an additional depositing device on the input side for the supply wire.

FIG. 7 shows diagrammatically the concept of the overall design of a stranding device VER according to the invention, preferably having a suspension device DGL on the input side and in accordance with FIG. 6, as well as a suspension device SZV on the output side and in accordance with FIGS. 1 to 5. Of a plurality of dispenser reels VS1 to VSn arranged concentrically about a stranding axis LA, for the sake of clarity FIG. 7 shows only two, specifically the dispenser reels VS1 and VSn. These dispenser reels VS1 to VSn contain the elongated stranding elements VE1 to VEn. The latter are fed via appropriate haul-offs (likewise not represented here, for the sake of clarity) to a fixed input device FS, in particular a guide disk having a row of bores distributed over the circumference (in the manner of a hole circle). Consideration is preferably given to electrical and/or optical transmission elements of different sizes, shapes and designs as stranding elements. These can be, for example, electric conductors (wires), electric striplines, optical conductors (such as, for example, optical fibers, loose buffers, multifiber units), fiber-optic ribbons, fiber-optic ribbon stacks, U-profile elements having optical fibers, as well as further types of round and non-round stranding elements. The preferably round passage bores of this input device FS serve in the region of the end of the SZ stranding device VER on the input side as guides for the respective stranding elements VE1 to VEn. In practice, a relatively large number, for example between n=2 and n=20 or more, of such stranding elements are provided.

In operation, the stranding of these stranding elements is performed with the aid of the elongated, rectilinearly extending, preferably stressed supply wire SD, which is set rotating in alternating directions (SZ stranding), as a result of which the stranding elements are wrapped on the outer circumference, that is to say on the smooth surface of the rectilinearly extending supply wire SD.

The supply member SD is mounted rotatably in the fixed input device FS. It is also possible, of course, to provide other bearings (not represented here in more detail) along the supply length of the supply wire SD.

For the sake of simplicity, only the stranding element VE1 is represented in the course of the supply member SD. The same type of wrapping preferably holds analogously for the other stranding elements. A stranding disk VS is provided at the right-hand end, on the output side, of the supply member SD, preferably in the suspension device SZV in accordance with FIGS. 1 to 5. The stranding disk VS is expediently seated securely there on the supply wire SD, that is to say it is preferably permanently connected to it. The stranding disk VS is driven via the toothed belt ZRS with the aid of the motor MO1 in accordance with FIG. 1. The stranding disk VS is in this way set rotating synchronously with the supply member SD. The stranding disk VS has a row of bores in the manner of a hole circle, in which in each case the stranding elements VE1 to VEn are individually guided. After leaving the supply member SD, the stranding elements reach the stranding nipple VN downstream of the stranding device SZV on the output side. In this stranding nipple VN, the stranding elements VE1 to VEn are combined to form a bundle VB and fed in the withdrawal direction or along the imaginary extension of the stranding axis LA to further processing devices (not represented here) such as, for example, a binder spinner, a torsion-inhibiting device, a haul-off, etc.

The stranding disk VS is preferably mounted together with further stranding components such as, for example, an adapter disk, the stranding elements, etc., at the end of the supply wire SD on the output side, thus forming a suspension device SZV according to the invention on the output side as in FIGS. 1 to 5.

The supply wire SD is preferably held under an axial tensile stress ZF for the purpose of SZ stranding. To this end, means for producing the axial prestressing ZF are provided at the end of the supply wire SD on the input side. The production of the tensile stress ZF is indicated diagrammatically by a prestressed spring pair FE. This spring pair FE is held securely at its outer end, averted from the supply wire SD, in an abutment GL1. The end of the supply member SD on the input side is rotatably suspended in a wire abutment, in particular a radial ball bearing, thrust bearing or the like. It is preferably constructed in accordance with the suspension device DVL, on the input side, of FIG. 6. The spring pair FE transmits its tensile force in the opposite direction ZF to the withdrawal direction AR onto the supply member SD by using retaining means RM, in particular a holding flange or jaws, to grip the abutment or the suspension device DGL on the input side from behind.

An axial abutment GL2 is provided in a fixed fashion at the other end of the supply member SD in the region of the stranding disk VS. This abutment GL2 can be formed, for example, by virtue of the fact that the stranding disk VS is axially supported in its outer region via a sleeve bearings against a fixed bearing block. Such a suspension of the supply wire SD is achieved on the output side preferably by means of the suspension device SZV according to FIGS. 1 to 5. Owing to this suspension of the supply wire SD, a continuous, axial tensile stress can be exerted on it, with the result that in operation a desired, defined axial tensile stress is applied to it. In this case, the bearings (GL1, DGL and GL2) form the essential components of suspension devices on the input and/or output sides for the supply member SD.

Of course, it is also possible to suspend the spring pair FE rotatably in the abutment GL1 on the input side. It can also be expedient to provide in the region of the input device FS a further drive motor MO3 which via a toothed belt ZR3 drives a toothed wheel ZD3 which, like the toothed wheel of the stranding disk VS, is permanently connected to the supply member SD.

The axial tensile stress can preferably be kept adjustable by appropriately designing the thrust bearings GL1 and GL2, as well as preferably not driving the two motors MO1 and MO2 synchronously. These measures advantageously render it possible to impose a torsional stress on the supply element SD, as the case may be, that is to say in the suspension formed by the bearings such as, for example, GL1, GL2 the supply element acts as a type of torsion bar, that is to say itself acts as a spring element. A torsionally elastic material is preferably selected for the supply element SD for this type of operation.

Any radial deflections which are produced are reduced by the axial prestressing of the supply wire SD. This renders it possible to realize supply wires having a relatively large overall length, that is to say supply length. The vibration behavior of the supply wire SD is substantially improved by stretching or stressing the latter. Because of the stabilization of the running smoothness of the supply wire SD, there is normally no need for an additional outer cover of the supply member SD. However, it can be expedient, as the case may be, additionally to mount individual guide rings such as, for example, FR1, FR2 respectively at local, individual points of the supply member SD in order to avoid flashing over of the stranding elements VE1 to VEn in a particularly reliable fashion.

Because of the suspension of the supply member SD in the two suspension devices DGL and SZV at the end, respectively on the input and output sides, of the supply wire SD, the process of fitting the stranding device VER according to the invention can in practice become more difficult, as the case may be. In order to achieve easier access to the supply length, in particular in the region of the stranding disk VS and of the input device FS, a depositing device AV is additionally provided for the supply wire SD on the input side upstream of the suspension device DGL of the supply wire SD, in particular the abutment GL1. The supply wire SD is drawn into said depositing device against the withdrawal direction LA, with the result that its supply length or the stranding device VER is essentially freely accessible. The depositing device AV is preferably formed by a take-up drum or take-up reel onto which the supply wire SD can be taken up into a mounting position. For taking-up purposes, the supply wire SD is expediently released with respect to its axial locking in the suspension devices DGL, SZV and drawn out of the suspension devices DGL, SZV axially in the direction EZ against the withdrawal direction LA and accommodated in the depositing device AV. In particular, the supply wire SD is drawn out of the stranding device VER and taken up onto the depositing device AV on the input side only to an extent such that, seen in the direction of passage LA, its end on the output side with the stranding disk VS is located directly behind the wire abutment DGL. This is preferably the case for a supported locking part of the wire abutment DGL such as, for example, TR4 in FIG. 6 having an inner passage whose inside diameter is selected to be smaller than the outside diameter of the stranding disk VS, in order to keep as low as possible the moment of inertia for the locking part TR4, driven by the supply wire SD, in FIG. 6. By depositing, in particular reeling up, the supply wire SD in the depositing device AV, reliable keeping of the supply wire SD is largely ensured during mounting. The relatively thin supply wire SD, which is more sensitive by comparison with current tube accumulators, thus cannot, for example, fall to the ground and, in this case, its smooth surface preferably cannot be damaged. In order to be able to carry out this receiving process in a particularly simple fashion, the depositing device AV expediently has a standing level D which corresponds approximately to the horizontal level of the supply wire SD in the suspension devices DGL, SZV. In particular, the standing level D is selected to be less than or equal to the middle level of the respective suspension device DGL, SZV as well as greater than or equal to approximately 50 times the supply wire diameter. In the case of the use of a take-up drum as the depositing device AV, the latter preferably has a pulley diameter of between 10 and 100 times, in particular between 5 and 50 times, the supply wire diameter. Such take-up drums can preferably be assigned a separate motor MO4, with the result that the supply wire SD can be brought into its mounting position ZKA automatically or unaided. The reeling-up process for the supply wire SD is indicated in this case by a rotation arrow RP.

In this way, the supply wire SD is freely accessible between the two suspension devices DGL, SZV for an operator. For example, an operator can reach the essential components of the stranding device VER unhindered in the case of an end to the running lengths or of a product change of the stranding elements VE1 to VEn, machine faults, work on wear and tear or servicing of the stranding device VER, a change of the supply wire SD or a change of further stranding components of the installation such as for example, adapter disks, guide rings, etc. In particular, new stranding elements VE1 to VEn can be inserted, free from confusion and crossovers, into the respectively assigned passage bores of the input device FS and/or of the stranding disk VS, and/or of an adapter disk which is possibly present, and drawn in along the stranding length of the supply wire SD. After termination of the drawing-in process of the stranding elements VE1 to VEn, the supply wire SD is withdrawn from the depositing device AV in the withdrawal direction LA, positioned, stretched in the axial direction, between the suspension devices DGL, SZV on the input and output sides and fixed there under tensile stress. After termination of this drawing-in process, the depositing device AV remains positioned in its position, on the input side, upstream of the suspension device DGL, it being the case that it does not hinder the functioning of the stranding device. The depositing device AV can, as the case may be, also be pushed away.

It can, as the case may be, also be expedient to hold ready, as in a magazine, various types of supply wires, for example having different diameters and lengths, on the input side in a plurality of, that is to say in more than one, depositing devices which then permit a quick change of the supply wire if required. In particular, a plurality of such depositing devices are arranged on the input side parallel to one another. In this arrangement, it is preferred for these supply wires to be prepared at the end, as described in relation to FIGS. 1 to 6.

In addition to or independently of the positioning, on the input side, of at least one depositing device AV upstream of the suspension device DGL for the supply member SD, it can also be expedient to provide a depositing device at the other end, on the output side, downstream of the suspension device SZV in the region of the stranding nipple VN for receiving the supply member SD. The statements made in relation to the depositing device AV on the input side then hold analogously for a depositing device positioned in such a way. For the sake of clarity, a depositing device arranged in such a way on the output side has been omitted from FIG. 7. The supply wire SD can then be withdrawn, for mounting work on the stranding device VER, in the withdrawal direction LA to at least one such depositing device on the output side, and be kept there in store.

In order further to facilitate the drawing-in process for the stranding elements VE1 to VEn or of the supply member SD, it can be expedient to configure the fixed guide rings FR1 and FR2 to be separable or capable of folding upwards, thus rendering it possible in a particularly simple way to guide through the supply wire SD and the stranding elements VE1 to VEn.

It is also possible, furthermore, to carry out Lang-lay stranding or other types of stranding with the aid of the stranding device VER according to the invention. In the case of Lang-lay stranding, by contrast with SZ stranding the supply wire SD is respectively set rotating only in one and the same direction of rotation. For this purpose, the supply wire SD is expediently supported rotatably at both ends and respectively driven in a synchronously rotating fashion.

The following steps are expediently carried out in order to exchange the stranding components:

Before the insertion of the receiving part AH2 into the locking part TR4 of the suspension device DGL on the input side, the clamping device GP of FIG. 6 is firstly located in a position which is situated displaced in the direction of passage LA nearer the suspension device SZV on the output side.

1. With its end on the input side, which preferably has the thickened part ADI of FIG. 6, the supply wire SD is guided against the direction of passage LA through the passage opening of the locking part TR4 of the wire abutment DGL of FIG. 6.
2. The thickened end piece ADI of the supply wire SD is inserted into the open receiving part AH2, on the input side, of FIG. 6 and secured in position there.
3. The two halves of the separable receiving part AH2 of FIG. 6 are assembled and plugged into the locking part TR4 of the suspension device DGL, on the input side, of FIG. 6 and secured in position there with the aid of locking means such as, for example, the latching balls K1* to Km*.
4. The stranding elements VE1 to VEn are drawn through the passage openings of the input device FS of FIG. 7 and threaded through the passage openings of the stranding disk VS and also temporarily fastened to the stranding disk VS, for example by means of strips of adhesive tape.
5. In this stress-relieved state, the supply wire SD with the stranding disk VS mounted on its end on the output side is drawn on the output side, together with the stranding elements VE1 to VEn, through the motor MO1, which is bored through, and through the support tube TR1 of the suspension device SZV on the output side.
6. The stranding disk VS with the supply wire SD fastened to it is inserted together with a possible adapter disk AS and/or further stranding components into the open, joint receiving part AH1. For this purpose, the receiving part AH1 is located outside the suspension device SZV. In this case, the stranding elements VE1 to VEn are further drawn by the stranding disk VS through the passage bores of the adapter disk AS.
7. The two halves of the receiving part AH1 are laid on one another, that is to say assembled, and the receiving part AH1 is locked in the connecting piece VK of the suspension device SZV on the output side of FIG. 1 with the aid of locking means such as, for example, the latching balls RK1 to RKm for the purpose of being secured in position.
8. Finally, the supply wire SD is stressed by moving the clamping device GP of FIG. 6 against the direction of passage LA, that is to say away from its mounting position into a clamping position further removed from the suspension device SZV on the output side.

Given an inner diameter of the suspension devices which is selected to be appropriately large, it can also be expedient for the supply wire SD with the stranding disk VS fastened to its end on the output side and/or its thickened part ADI provided on the end on the input side to be unreeled from a depositing device on the input side, in particular a dispenser reel such as, for example, AV in FIG. 7, and to be drawn in the direction of passage LA through the suspension device DGL on the input side as well as the suspension device SZV on the output side. The respective suspension at the end is then expediently further performed in a fashion analogous to the above steps 2 to 7.

For the purpose of mounting on the supply wire stranding device VER of FIG. 7, the supply wire SD is preferably kept on the depositing device AV, in particular dispenser reel, the above steps expediently being carried out in the reverse sequence.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A device for stranding elongated stranding elements, comprising:

an axially extending supply member having a surface on which stranding elements are fed to a stranding disk;

a first suspension device having a first receiving device for holding a first end of the supply member on an input side of the device, and a second suspension device having a second receiving device for holding a second end of the supply member on an output side of the device;

first and second locking devices for respectively mounting the first and second receiving devices in the first and second suspension devices, respectively, such that in a release position of a respective locking device, a respective receiving device is completely displaceable in an axial direction for installing or removing the supply member, and such that in a lock position of the respective locking device, the respective receiving device is secured against detachment during operation of the supply member.

2. The device as claimed in claim 1, wherein at least one of the suspension devices has a device for axial prestressing the supply member.

3. The device as claimed in claim 1, wherein the supply member and the stranding disk are jointly accommodated in the second receiving device on the output side.

4. The device as claimed in claim 1, wherein the supply member is a stressed supply wire.

5. The device as claimed in claim 1, wherein the respective suspension device has, for axially securing the respective receiving device, latching balls as the locking device, which latch tight latching balls are latchable in a transverse axial fashion into an associated latching groove of the respective receiving device.

6. The device as claimed in claim 1, wherein the respective suspension device has self-closed connections as the locking device for securing the respective receiving device in a circumferential direction.

7. The device as claimed in claim 6, wherein the self-closed connection is a polygonal gearing between the respective receiving device and the respective suspension device.

8. The device as claimed in claim 6, wherein the self-closed connection is a conical seat between the respective receiving device and the respective suspension device.

9. The device as claimed in claim 1, wherein the respective receiving device has two separable halves.

10. The device as claimed in claim 1, wherein the stranding disk is secured in position in a circumferential direction by self-closed connections in the respective receiving device.

11. The device as claimed in claim 1, wherein the supply member is permanently connected at one end thereof to the stranding disk.

12. The device as claimed in claim 1, wherein the supply member is suspended in a rotatable fashion in the first and second suspension devices on the input side and output side, respectively.

13. The device as claimed in claim 1, wherein the supply member and the stranding disk are assigned a joint driving device.

14. The device as claimed in claim 13, wherein the driving device is formed by a motor with a bored center thereby forming a passage opening for guiding through the supply member with the stranding elements.

15. The device as claimed in claim 1, wherein the supply member is substantially freely accessible between the first and second suspension devices on the input side and output side, respectively.

16. The device as claimed in claim 1, wherein the second suspension device on the output side is assigned a winding device.

17. The device as claimed in claim 1, wherein the stranding elements are at least one of electric and optical transmission elements.

18. The device as claimed in claim 1, wherein, in a direction of passage, at least one depositing device for receiving the supply member is additionally provided upstream of the first suspension device on the input side or downstream of the second suspension device on the output side.

19. The device as claimed in claim 18, wherein the at least one depositing device is a take-up drum.

20. The device as claimed in claim 18, wherein the at least one depositing device has a standing level which corresponds approximately to a horizontal level of the supply member in the respective suspension device.

21. The device as claimed in claim 1, wherein an input device for the stranding elements is located at the end of the supply member on the input side.

22. The device as claimed in claim 1, wherein further stranding components are provided in each of the receiving devices for assembly or disassembly the supply wire is mounted displaceably in an axial direction in the respective suspension device.

23. The device as claimed in claim 1, wherein each receiving device of the first and second receiving devices has further stranding components.

24. The device as claimed in claim 23, wherein the further stranding components are at least one of adapter disks, and stranding nipples.

25. A method for exchanging a supply member used in stranding elongated stranding elements in an apparatus, comprising the steps of:

providing an axially extending supply member having a surface on which stranding elements are fed to a stranding disk;

providing a first suspension device having a first receiving device for holding a first end of the supply member on an input side of the apparatus, and a second suspension device having a second receiving device for holding a second end of the supply member on an output side of the apparatus;

providing first and second locking devices for respectively mounting the first and second receiving devices in the first and second suspension devices, respectively, such that in a release position of a respective locking device, a respective receiving device is completely displaceable in an axial direction for installing or removing the supply member, and such that in a lock position of the respective locking device, the respective receiving device is secured against detachment during operation of the supply member;

bringing each of the first locking device of the first suspension device at the input side and the second locking device of the second suspension device at the output side into lock positions thereof in which each of the first and second receiving devices is secured against detachment during operation of the supply member; and bringing each of the first and second locking devices into release positions thereof allowing each of the first and second receiving devices to be completely displaceable for exchanging installing or removing the supply member.

26. The method as claimed in claim 25, wherein the method further comprises running the supply member with an alternating direction.

27. The method as claimed in claim 25, wherein the method further comprises additionally depositing, in the direction of passage, the supply member in at least one depositing device upstream of the first suspension device on the input side or downstream of the second suspension device on the output side.

* * * * *